(12) United States Patent
Klein

(10) Patent No.: US 8,090,995 B2
(45) Date of Patent: Jan. 3, 2012

(54) SYSTEM MONITORING

(75) Inventor: Udo Klein, Maximiliamsau (DE)

(73) Assignee: SAP AG, Walldorf (DE)

( * ) Notice: Subject to any disclaimer, the term of this patent is extended or adjusted under 35 U.S.C. 154(b) by 86 days.

(21) Appl. No.: 12/624,279

(22) Filed: Nov. 23, 2009

(65) Prior Publication Data

US 2011/0126059 A1    May 26, 2011

(51) Int. Cl.
*G06F 11/00* (2006.01)

(52) U.S. Cl. .......................................... 714/46

(58) Field of Classification Search .................. 714/1, 2, 714/4.11, 16–18, 26, 37, 38.1, 39, 40, 46, 714/47.1, 47.3, 48, 51, 57
See application file for complete search history.

(56) References Cited

U.S. PATENT DOCUMENTS

| | | | |
|---|---|---|---|
| 6,691,244 B1 * | 2/2004 | Kampe et al. ................. | 714/4.1 |
| 6,859,834 B1 * | 2/2005 | Arora et al. ................... | 709/227 |
| 6,954,874 B1 * | 10/2005 | Daferner et al. ................ | 714/1 |
| 7,216,257 B2 * | 5/2007 | Kilian ........................... | 714/31 |
| 2005/0172168 A1 * | 8/2005 | Kilian ........................... | 714/31 |
| 2006/0045039 A1 * | 3/2006 | Tsuneya et al. ................ | 370/318 |
| 2006/0085535 A1 * | 4/2006 | Motoyama et al. ............. | 709/224 |
| 2007/0022331 A1 * | 1/2007 | Jamieson et al. .............. | 714/712 |
| 2007/0174715 A1 * | 7/2007 | Kilian ........................... | 714/38 |
| 2008/0216093 A1 * | 9/2008 | MacLellan et al. ............. | 719/318 |
| 2009/0199051 A1 * | 8/2009 | Jann et al. ..................... | 714/57 |

* cited by examiner

*Primary Examiner* — Nadeem Iqbal

(74) *Attorney, Agent, or Firm* — Mintz, Levin, Cohn, Ferris, Glovsky & Popeo, P.C.

(57) ABSTRACT

Disclosed are methods, systems and products, including a method that includes monitoring one or more service providing components implemented using at least one processor-based device, the one or more service providing components being connected to an interfacing system configured to control requests for service received from client units that require servicing from at least one of the one or more service providing components. The interfacing system is also configured to assign the requests to the one or more service providing components. The monitoring is initiated by equipment associated with one or more of the interfacing system and at least one of the one or more service providing components. The method also includes generating information regarding the operability of at least one of the one or more service providing components based on data generated in response to monitoring the one or more service providing components.

19 Claims, 5 Drawing Sheets

SYSTEM MONITORING

BACKGROUND

The present disclosure relates to system monitoring, and more particularly to monitoring multiple service providing components using, for example, incident correlation for cluster monitoring.

Centralized service-providing components, for example, server components available in a computing environment implemented based on SAP's "By Design" (ByD) architecture, are generally stateless shared components that may be used by many clients (or users) connected to the implemented computing/network environment. In some implementations, the multiple service providing components are interconnected to a load balancing server that interfaces between the clients and the service providing components. The load balancing server receives requests for service originating from one or more of the interconnected clients and controls the distribution/assignment of the requests for service to one or more service providing components in the multi-component cluster the load balancing server regulates.

In the above-described networking environment there may be many reasons for service failure (e.g., failure to serve requests from a particular client, delays in providing service, etc.). Generally, problem/failure monitoring is performed "end-to-end." That is, clients (users) perform so-called "health checks" to probe and determine the availability of any one component. This approach, however, may result in multiple alerts of failure (e.g., one per client) in the event that a particular service-providing component has failed.

SUMMARY

Described herein are methods, apparatus and computer program products, including a method that includes monitoring one or more service providing components connected to an interfacing system. The interfacing system is configured to control requests for service received from client units requiring servicing from at least one of the one or more service providing components and to assign the requests to the one or more of the service providing components. The monitoring is initiated by equipment associated with one or more of, for example, the interfacing system (e.g., health check instrumentation and/or the interfacing system) and/or at least one of the one or more service providing components (e.g., monitoring agents and/or any of the service providing components). The method also includes generating information regarding the operability of at least one of the one or more service providing components based on data generated in response to monitoring the one or more service providing components.

In some implementations, some of the devices comprising the server-client environment are independently equipped with monitoring instrumentation to facilitate an efficient monitoring of the system. In some implementations, the interfacing system, which may include a load balancing server, and the centralize service-providing components are equipped with separate and independent instrumentations. In such implementations, the interfacing system may be configured to generate a failure notification if, for example, all the various service providing components fail.

In one aspect, a method is disclosed. The method includes monitoring one or more service providing components implemented using at least one processor-based device, the one or more service providing components being connected to an interfacing system configured to control requests for service received from client units that require servicing from at least one of the one or more service providing components. The interfacing system is also configured to assign the requests to the one or more service providing components. The monitoring is initiated by equipment associated with one or more of the interfacing system and at least one of the one or more service providing components. The method also includes generating information regarding the operability of at least one of the one or more service providing components based on data generated in response to monitoring the one or more service providing components.

Embodiments of the method include one or more of the following features.

Generating information may include communicating an indication of system failure if all the monitored one or more service providing components fail to respond.

Generating information may include triggering alerts indicative of failure of at least one of the one or more of the service providing components.

The method may further include resolving, based on the generated information, at least one of, for example, a failure of one of the one or more service providing components and/or a communication link failure of any of the service providing components, the client units and the interfacing system.

The interfacing system may includes one or more of, for example, a load balancing server to distribute requests for service to the one or more service providing components and/or a host system to control the client units connected to the interfacing system.

Monitoring the one or more service providing components may include monitoring the one or more service providing components using a monitoring module included with one or more of the load balancing server and the host system.

The method may further include monitoring reachability of the interfacing system from any one of the client units.

Monitoring the one or more service providing components may include determining, by respective monitoring agents included with at least some of the one or more service providing components, the operability status of the associated one or more service providing components, and communicating data based on the determined operability status to the interfacing system.

The monitoring agents may include at least one Wily™ monitoring agent.

In another aspect, a system is disclosed. The system includes one or more service providing components implemented using at least one processor-based device, and one or more client units each configured to generate requests for service to be serviced by some of the one or more service providing components. The one or more client units are implemented using at least one other processor-based device. The system further includes an interfacing system in communication with the one or more service providing components. The interfacing system is configured to control the requests for service generated by the one or more client units and to assign the requests to the one or more service providing components. The system additionally includes monitoring equipment to monitor the one or more service providing components, the monitoring equipment being associated with one or more of, for example, the interfacing system and/or at least one of the one or more service providing components. The monitoring is initiated by one or more of, for example, the monitoring equipment, the interfacing system and/or the one or more service providing components.

Embodiments of the system may include any of the above-described features of the method, as well as one or more of the following features.

The system may further include an output unit to present information regarding the operability of at least one of the one or more service providing components based on data generated by monitoring the one or more service providing components.

In a further aspect, a computer program product is disclosed. The computer program product resides on a computer readable storage device that includes computer instructions that, when executed on a processor-based device, cause the processor-based device to monitor one or more service providing components connected to an interfacing system configured to control requests for service received from client units that require servicing from the one or more service providing components and to assign the requests to at least one of the one or more of the service providing components. The monitoring is initiated by equipment associated with one or more of, for example, the interfacing system and/or at least one of the one or more service providing components. The computer instructions further cause the processor-based device to generate information regarding the operability of at least one of the one or more service providing components based on data generated in response to monitoring the one or more service providing components.

Embodiments of the computer program product may include any of the above-described features of the method and system, as well as one or more of the following features.

The computer instructions that cause the processor-based device to generate information may include instructions that cause the processor-based device to communicate an indication of system failure if all the monitored one or more service providing components fail to respond.

In yet another aspect, a method is disclosed. The method includes performing a first monitoring of reachability of an interfacing system from one or more client units interconnected to the interfacing system, the one or more client units implemented using at least one processor-based device. The method also includes performing a second monitoring of a global availability of one or more service providing components interconnected to the interfacing system, the one or more service providing components servicing requests for service sent by at least one of the one or more client units and are assigned to at least one of the one or more service providing component by the interfacing system, the one or more service providing components implemented using at least one other processor-based device. The method further includes performing a third monitoring of one or more of the operability, availability and reachability of at least one of the one or more service providing components. The method also includes determining, based on at least one of, for example, the first monitoring, the second monitoring and/or the third monitoring, at least one of, for example, operability, availability and/or reachability status of at least one of, for example, the interfacing system, the one or more service providing components and/or the one or more client units. The second and third monitoring are performed using equipment associated with one or more of, for example, the interfacing system and/or at least one of the one or more service providing components.

Embodiments of the method may include any of the above-described features of the first method, the system, and the computer program product, as well as one or more of the following features.

Determining the at least one of, for example, operability, availability and/or reachability status may include determining occurrence of no connectivity between one of the one or more client units and the interfacing system based on an indication generated in response to the first monitoring that the interfacing is not reachable from the one of the one or more client units.

Determining the at least one of, for example, operability, availability and/or reachability status may include determining occurrence of no availability of service from any of the one or more service providing components based on an indication, generated in response to the second monitoring, that the one or more service providing components are not globally available from the interfacing system.

Determining the at least one of, for example, operability availability and/or reachability status may include determining occurrence of a component failure at a particular one of the one or more service providing components based on an indication generated in response to the third monitoring that service at the particular one of the one or more service providing components is not available from the interfacing system.

Performing the third monitoring may include monitoring each of the one or more service providing components using a Wily instrumentation controlled by a health check procedure executing from a service provider cockpit of the interfacing system, determining, by respective monitoring agents included with at least some of the one or more service providing components, operability data of the associated at least some of the one or more service providing components, and communicating data based on the determined operability data to the interfacing system. The monitoring agents may include agents configured to operate in a Wily Introscope™ system.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
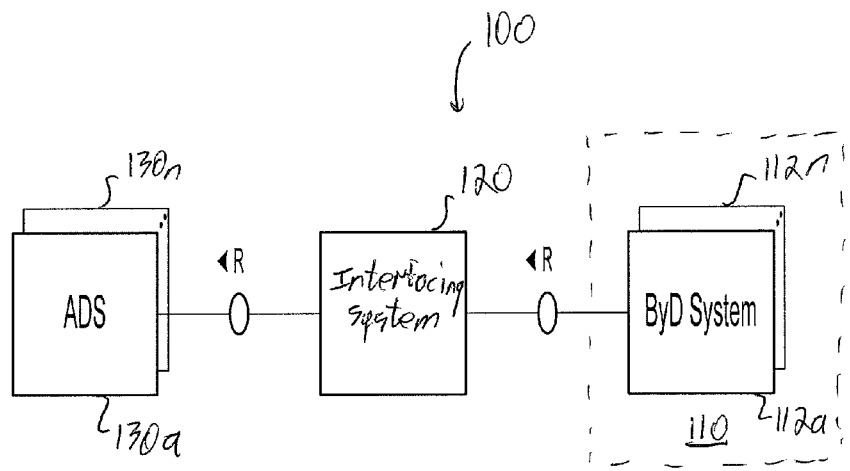
FIG. 1 is a schematic diagram of a system to be monitored.

Described herein are methods, apparatus and computer program products, including a method to monitor operability, availability, and/or reachability of components/modules/device constituting a system such as a network that includes one or more service providing components interconnected to one or more client units via an interfacing system. The one or more client units can request services from the service providing components by generating requests managed by the interfacing system (which may include a load balancing server), e.g., assigning requests to one of the one or more service providing components. In some implementations, the method includes performing a first monitoring of a reachability of the interfacing system from the one or more client units via the interfacing system interconnectable to the interfacing system. This first monitoring operation thus enables determination of the connectivity of the clients unit to the interfacing system. An indication of no connectivity (or no reachability) from a particular client unit to the load balancing unit can therefore identify the source of a service-related problem to the connection between the particular client unit and the interfacing system, rather than as a problem stemming from possible failure of any of the service providing components.

The method further includes performing a second monitoring of a global availability of one or more service providing components interconnectable to the interfacing system. This monitoring operation can identify whether there is a general, or global, service failure that results in a complete failure to provide any service to any of the client units. In response to a determination of a failure of this nature, the interfacing system can notify the various client units of the global service failure, thus avoiding the need for individual clients units to separately and independently monitor service providing components (which may, consequently, cause generation of multiple alerts, each alert generated as a result of each separate monitoring operation by the various client units). The method may also include performing a third monitoring of one or more of the operability, availability, and reachability of each of the one or more service providing components. Here, the interfacing system interacts with, for example, monitoring instrumentation included with the service providing components to determine their availability, reachability, and operability.

Based on at least one of the first monitoring operation, the second monitoring operation and the third monitoring operation, one of, for example, the operability, availability, and/or reachability status of at least one of the interfacing system, the one or more service providing components, and the one or more client units may be determined. In the described monitoring operations, the second and third monitoring operations are performed using equipment associated with one or more of, for example, the interfacing system and/or at least one of the one or more service providing components. Thus, in performing the second and third monitoring operations, multiple redundant monitoring operations initiated by the various client units are avoided.

Also described herein are methods, systems and computer program products, including a method that includes monitoring one or more service providing components connected to an interfacing system that is configured to control requests for service received from client units and to assign the requests to the one or more of the service providing components. The monitoring is initiated by equipment associated with the interfacing system and/or at least one of the one or more service providing components.

With reference to FIG. 1, a schematic diagram of a system 100 implementing the networking environment that is to be monitored as described herein is shown. The system 100 includes one or more client units 112a-n included in a system 100 such as a "By Design" (ByD) system developed and implemented by SAP™ (e.g., SAP's ByD Release 2.5). Any number of client units may be included in the ByD system. As will be described in greater detail below, a ByD system is generally a heterogeneous setup of different sub systems. In some implementations, the "core" of the ByD system includes ABAP Systems (e.g., systems implemented using Advanced Business Application Programming). ABAP systems have somewhat inherent load balancing capabilities. The ByD system may also include satellite sub-systems called "central components," or service providing components, that are shared, for example, by the ABAP systems. Some service providing components, such as Java-based sub-systems are, in some implementations, load balanced with the help of dedicated hardware load balancers. In some implementations, a management system to control some or all of the sub-systems constituting the ByD system may be used.

The ByD system 110 is interconnected to an interfacing system 120 configured to receive requests for service from one or more of the multiple client units 112a-n and distribute the requests to one or more service providing components 130a-n in a cluster of applications that can perform processing operations to service requests from clients (here too, any number of service providing components may be included). The service providing components 130a-n may include such applications as Adobe Document Server (ADS), application supported by a JRC framework (e.g., report rendering servers, used to render reports/graphics), KTP-based applications (e.g., Document Servers used to serve static documents, especially documentation), database applications (applications maintaining and managing data stored at a primary storage persistency), applications using implementations supported by TREX (a secondary storage persistency holding replicated data in order to facilitate performing fast queries), implemented based on ABAP (Advanced Business Application Programming, which is a high level programming language developed by SAP™), etc. As will be described in greater details below, the interfacing system 120 and/or some or all of the service providing components and/or the client units may be provided with monitoring instrumentations to enable monitoring at least some of the parts constituting the system 100. Based on data collected through the interplay of the monitoring operations performed by the various monitoring instrumentations, the status of the operability, availability, and/or reachability of the various parts of the system 100 can be determined without expending excessive computing resources (e.g., avoiding generating multiple redundant health checks of the service providing components, avoiding the generation of multiple redundant failure alerts, etc.)

Figure 2:
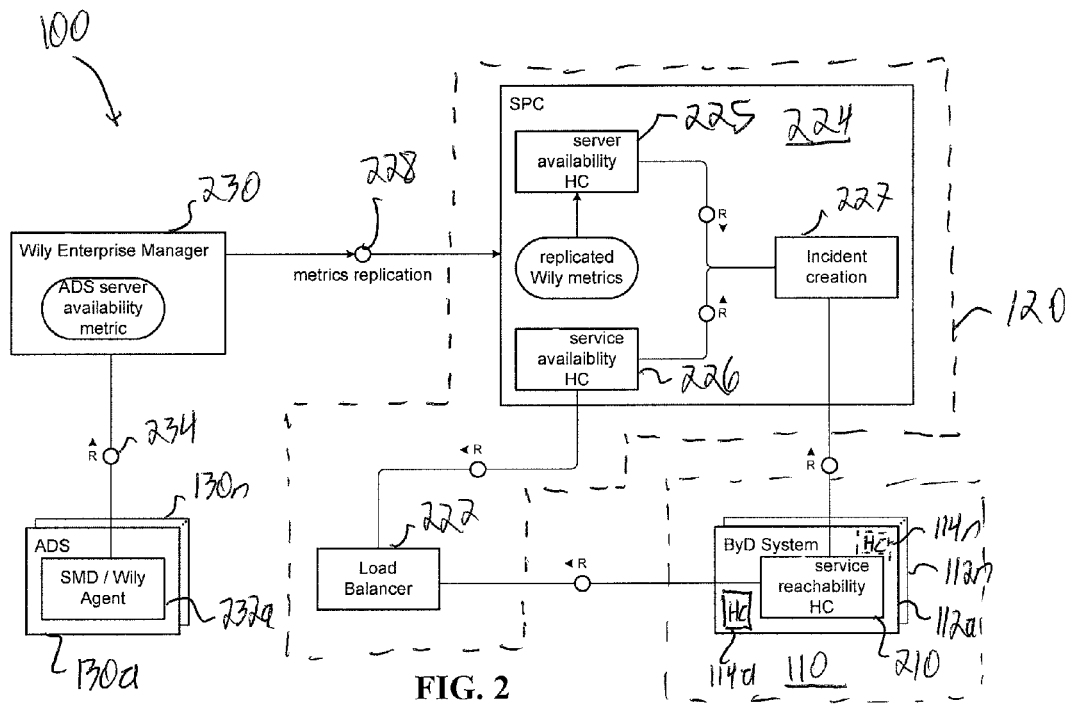
FIG. 2 is a more detailed schematic diagram of the system of FIG. 1.

With reference to FIG. 2, a more detailed schematic diagram of the system 100 of FIG. 1, depicting implementations of the monitoring instrumentation that may be used, is shown. The ByD system 110 includes, in addition to the interconnected client units, a service healthcheck (HC) instrumentation 210 configured to monitor and report system status (e.g., operability, availability, and/or reachability of various interconnected system components). In some implementations, the HC instrumentation 210 may include, for example, an application (e.g., implemented based on ABAP) to perform periodic checks of the state of applications and/or services. Within the healthcheck framework, the outcome of a specific health check can trigger an incident or terminate previously invoked incidents. The HC instrumentation 210 may be configured to probe, for example, the load balancing server (also referred to as the load balancer) of the interfacing system to determine if service from the one or more service providing components can be reached or is otherwise available. A notification (generated, for example, by a load balancing server 222 constituting part of the interfacing system 120) that service is not available may be indicative that either all the service providing components are inoperable, or that there is a communication link failure between the load balancing server 222 and the components. Alternatively, failure of the load balancing server 222 to respond may be indicative that there may be a communication link interruption between some or all of the one or more of the client units 112a-n and the load balancing server. As described herein, because the load balancing server is configured to distribute requests for services from the client units to one or more of the service providing components 130a-n, the load balancing server represents a single point of failure (i.e., if the load balancing server fails/malfunctions, the entire system 100 may become non-operational). In some implementations, this system vulnerability may be mitigated by implementing the load balancing server using two or more separate machines/devices (e.g., processor-based machines/devices) to introduce redundancy into the system. Under those circumstances, although the load balancing server remains a single point of failure that potentially could render the whole system inoperable, by introducing multiple redundant machines/device, the overall reliability of the load balancing server becomes relatively high. As long as the power lines and network lines are not cut or otherwise impaired/damaged, there is a general low probability that the load balancing server 222 would fail.

In some implementations, dedicated monitoring instrumentation may be included with at least some of the various client units 112a-n of the client cluster 110 (be it a ByD-based cluster or some other type of client architecture/landscape) to enable individual determination of the operability, availability and/or reachability of the interfacing system and/or the one or more service providing components by the at least some of client units. Under those circumstances, client units equipped with monitoring instrumentations can individually identify problems that may be specific to them (e.g., a broken communication links from a particular client unit to the load balancing server 222, etc.) For example, as shown in FIG. 2, the client units 112a-n may each be equipped with a monitoring instrumentation 114a-n, respectively, configured to probe the load balancing server 222 and/or a ByD host 224 (such as a service provider cockpit, or SPC) forming part of the interfacing system to determine if each of the client units can communicate with either the load balancing server and/or the SPC 224. Failure of the load balancing server 222 and/or the SPC 224 to respond to such probes can trigger an alert regarding the conncectability of a particular client unit to the load balancing server 222 and/or the SPC 224, e.g., monitoring by each client unit can be done at regular pre-determined intervals known to the server 222 and/or the SPC 224, and the failure to receive a timely monitoring signal from a particular client unit can thus indicate that there is a connectability problem. In some implementations, the monitoring instrumentations 114a-n can be implemented as software (e.g., based on ABAP), hardware, and/or a combination of the two.

As noted, coupled to the client cluster is a client host 224 such as the SPC that facilitates the client service request operations. In ByD-based implementations, the SPC 224 is the main entry point for hosting operations. The SPC controls the "ByDesign Landscape Directory" BLD. The BLD is the central storage location for maintaining ByD landscape information. The BLD generally holds the target system landscape "to be" state and the most up to date centralized "as is" state. Thus, network components/systems that are to be monitored can be identified using the SPC's BLD. The BLD is used to compute configuration data under SPC control, including configurations for a Wily monitoring system (e.g., Wily Introscope™) which may be compiled from BLD information. Generally, recompilation of the Wily configuration is required whenever systems are added and/or removed, or when metrics are added and/or removed. In some implementations, because the SPC may also control threshold values that are used in the course of performing monitoring operations (e.g., in determining whether to trigger an alert), it may be necessary to recompile the Wily configuration upon changes to threshold values.

In implementations that are based on SMD/Wily monitoring technology (SMD is SAP's Solution Manager Diagnostics tool for monitoring large scale installations), some of the modules/parts of the SMD/Wily systems may include, a) existing monitoring instrumentation for Wily, such as the Hostadapter (or Wily Hostagent) and JMX extensions for the Wily byte code Agent, b) existing tools to control the Wily configuration structure including, for example, a tool to analyze configuration files of a Wily Enterprise Manager 230 and a tool to modify Wily Enterprise Manager™ configuration files, and c) the Service Provider Cockpit (SPC) tool described above which is a standard tool for ByD Hosting Management.

As further shown in FIG. 2, the SPC 224 is coupled to the Wily Enterprise Manager (EM) 230, which is an application configured to act as a central repository for performance data and metrics collected in an application/network environment. The Wily EM 230 receives data relating to performance metrics from individual Wily agents installed or embedded on at least some of service providing components 130a-n. For example, as shown in FIG. 2, an agent such as the SMD/Wily agent 232a is connected (e.g., installed) on a service providing component such as, for example, the service providing component 130a. In some implementations, the embedded Wily agent are implemented as, for example, a software-based module, a hardware-based module, or a combination of hardware and software. Generally, the Wily platform (one implementation of which may be the Wily Introscope, which, in some implementations, is a java-based monitoring application) includes pre-defined and/or modifiable tests and monitoring metrics that can be controlled through user input received via an interface (e.g., a graphic-user interface enabling user interaction with the Wily-based system). Thus, in some implementations, controlling (e.g., modifying the tests, metrics and/or thresholds) to be used in monitoring, the system 100 may be performed via the Wily EM 230 and/or the interfacing system 120.

The Wily Enterprise Manager 230 may communicate with one or more of the individually embedded agents on the service providing components of the system to configure the monitoring functionality of those agents. The individual agents may be configured to perform tests to determine operability of components to which they are connected, determine response times (e.g., maximum, minimum and average response times), data flow parameters (e.g., data bandwidth), data integrity and other performance metrics that may be useful for system administrators and users.

Figure 6:
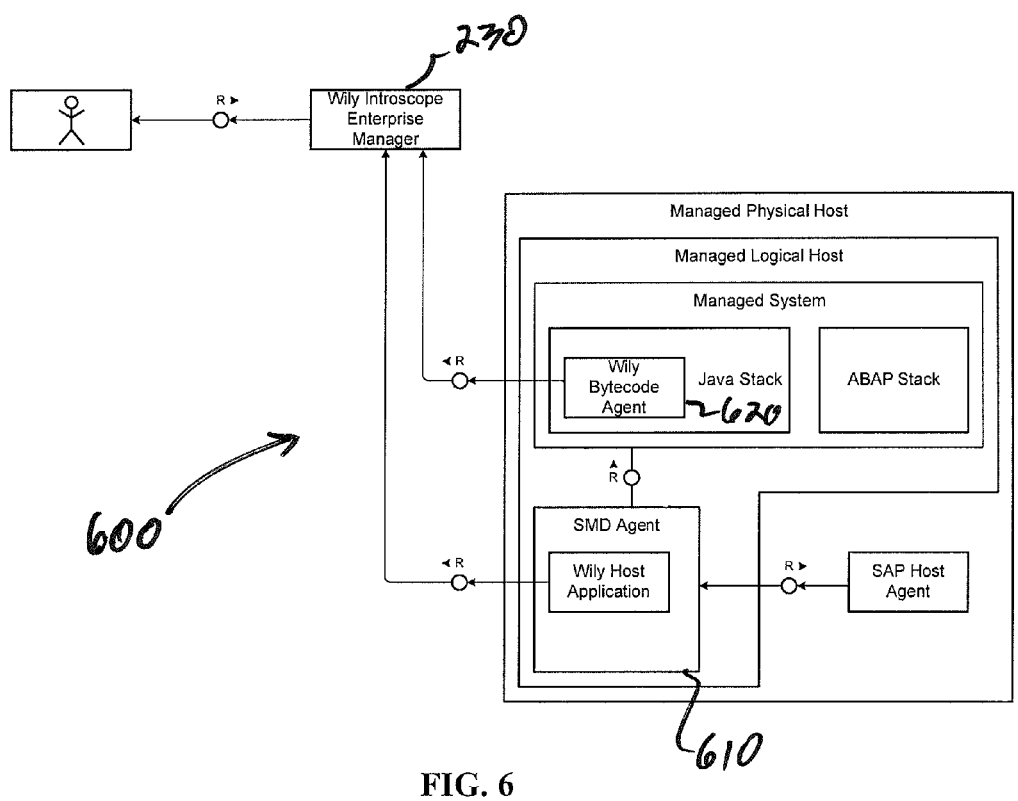
FIG. 6 is a schematic diagram of an example Wily/SMD agent.

As noted, a suitable monitoring agent that may be used in some implementations is a Wily/SMD agent. A schematic diagram of an example Wily/SMD agent 600 is shown in FIG. 6. To provide monitoring information to the Wily Introscope Enterprise Manager 230, an SMD agent 610 may be used. For example, a plugin called "agelet" installed on the SMD agent 610 is configured to send at least some of collected monitoring data to a Wily Bytecode agent 620. The Wily host application in turn forwards the received monitoring data to the Wily EM 230.

Thus, in implementations such as the agent 600 of FIG. 6, some of the monitoring data (monitoring metrics) will be retrieved by the SMD agent, while some of the monitoring data (typically a small percentage of metrics that are provided to the Wily EM 230) are obtained by the Wily Bytecode Agent 620. The SMD agent 610 can generally tap into many of the monitoring/metric sources available from SAP. These include SAP CCMS, NWA Management, SAPOsCol, SAPHostcontrol, SAPStartSrv, Jcontrol, and Jlaunch.

With reference again to FIG. 2, as shown, in operation a performance monitoring agent, such as a Wily agent 232a connected to its respective service providing component (such as the ADS component 130a), monitors and measures the performance of its associated component and computes, based on the measured data, one or more performance metrics. The metrics may be computed and/or converted to a format compatible with a central performance controller and repository collecting information from multiple monitoring agents (e.g., the Wily Enterprise Manager 230), and communicated to it (communication of the performance data to the Wily EM 230 is depicted in FIG. 2 using the flow arrow 234). The Wily EM 230 receives the performance metrics from the various agents with which it communicates, and performs further processing on the received data. For example, the Wily EM 230 may store the data in its repository, compute global performance metrics based on the performance metrics received from individual agents, convert the metrics into a different format compatible with the formatting supported by, for example, the SPC 220 (e.g., to enable processing by ABAP-based applications of the SPC 220), etc. The Wily EM 230 is also configured to render dashboards to be presented on a display device, through which output may be provided (e.g., presented) to users. The Wily EM 230 may also be configured, in some implementations, to trigger alerts.

Output generated by the Wily EM 230 based on data received from the various monitoring agents is communicated (as indicated by the arrow 228) to the SPC 224. The SPC 224 thus receives operability data from various sources of monitoring systems/instrumentations, and based on the received data it causes appropriate action to be performed. For example, based on the received data indicating the existence of some network problem (be it an unresponsive service providing component, a status indication from an ADS service reachability HC 226, or some other monitoring module, indicating that the entire cluster service providing component is unreachable, etc.), the SPC causes an incident to be produced (e.g., by the incident creation module 227). The SPC 224 may also commence appropriate action to resolve automatically at least some types of incidents. For example, if an identified incident relates to a specific service providing component not responding, the SPC can cause the re-initiation of the communication link between the SPC (or whichever host is used to support and connect the client units) and the non-responsive service-providing component.

As noted, the use of different monitoring instrumentations at various positions in the configuration of system 100 enables the identification of specific network problems/incidents without having to perform monitoring from individual client units. An approach based on monitoring service providing components from individual client units may cause a flood of alerts because each client unit could conceivably initiate a monitoring operation that would identify particular problems at the interfacing system and/or the service providing components independently. More specifically, with continued reference to the system and monitoring configuration depicted in FIG. 2, connectivity status of each of the client units connected to the system 100 may be determined by individual reachability monitors, associated with each of the client units 112a-n that probe the interfacing system 120 or by a central reachability HC instrumentation 210 associated with the system 110. If the HC instrumentation 210 responds to a particular monitoring probe from the probing monitoring instrumentation of the probing client unit, no further action is required, and thus neither the reachability instrumentation 210 or the instrumentation of the client units (e.g., one of the monitoring instrumentations 114a-n) has to notify the SPC of the occurrence of an incident. On the other hand, if the reachability HC instrumentation 210 does not respond to a particular monitoring probe, this may be indicative that there may be a connectivity problem between the probing client unit and the system 110 and/or the interfacing system 120.

To determine whether the entire cluster of service providing components is available and/or if a connectivity problem between the interfacing system and the service providing components exists, the service availability HC instrumentation 226, which may be installed on the SPC 224 and/or the load balancing server 222, probes the whole of the cluster of service providing components by, for example, broadcasting a monitoring communication to all the service providing components 130a-n interconnected to the interfacing system 120 and/or the host 220 (such as an SPC). Receipt of a response from at least one of the service providing components is indicative that the interfacing system 120 (which may include the load balancing server 222 and/or the host 224) is connected to at least one service providing component and that therefore there is service availability between the interfacing system 120 and the cluster of service providing components. It is to be noted that this configuration and operation of the availability instrumentation avoids the need to have the various client units individually monitor the various service providing components. In some implementations, the availability instrumentation 226 may be configured to send individual availability probes to the service providing components 130a-n. The availability monitoring instrumentation 226 can then determine which service providing component did not respond to thus more specifically identify availability problems between the interfacing system and the various service providing components.

In some implementations, a dedicated monitoring module, e.g., server availability HC 225, configured to individually probe the service providing components 130a-n (e.g., one or more Adobe Document Server, and/or other types of service providing components) to determine the operability, availability, and/or reachability of such individual service providing components, may be used.

Monitoring both the overall service operability, availability, and/or reachability enables better control over the system's resources. Particularly, and as noted above, whenever an ADS server (e.g., one of the service providing components 130a-n) fails the load balancing server will notice that that component cannot handle any additional load. Hence, the load balancing server will dispatch requests to the remaining n−1 components. Thus, the impact of a component failure is that the currently processed requests on that failed component may be lost, but any further requests (including retries) will be handled by the still functioning service providing components.

The failure of every additional service providing component implies that the requests-handling load for the remaining components will go up because the remaining components have to deal with a load that was previously handled by more components. As a result, the probability of failure for any of the remaining components increases (because they now have to handle a bigger load). If one component fails, this is generally not critical. However, if several components fail, chances are that the remaining components left to serve service requests will become overloaded and will therefore fail too.

Accordingly, it is important to monitor each component separately by the dedicated server availability HC 225 and/or by the service availability HC 226 having the functionality to individually monitor the components, to prevent undetected failures, and to take remedial actions with respect to individually failed components rather than wait for an overall system failure that would render the entire system 100 inoperable.

Determination of operability of individual service providing components can be facilitated through individual monitoring agents installed on each of the service providing components. As described herein, such monitoring agents (for example, SMD/Wily agents in implementations that use a Wily Introscope framework) can provide the interfacing system 120, via, for example, the Wily Enterprise Manager 230, with performance metrics of the respective components with which they are associated. Such instrumentation can also generate metrics data representative of component failure. Alternatively and/or additionally, if a communication from a particular agent is not received within some predetermined time period, the respective component associated with that agent may be deemed to be not operating. Particularly, in some implementations, the SPC, for example, can determine from the data stored on the BLD which monitoring agents are installed and should be reporting, as well as which metrics to expect. Accordingly, the SPC 220 can determine if the expected metrics actually arrived. In this type of implementations, the SPC can be thought of as checking an agent's heart beats. Failure to receive expected data from one or more of the agents may thus be indicative of some problem, e.g., failed network connections, failed network components, a Wily EM restart or failure condition, etc. To ensure that agents report properly, the SPC may run a health check to detect if agents' metrics are arriving properly.

It is to be noted that monitoring performed by the HC 210 and/or the availability monitoring 222 are sometime referred to as infrastructure monitoring while monitoring of the applications by the monitoring agents included with the service providing components are referred to as application monitoring. It is also to be noted that while the system depicted in FIG. 2 is based on the use of a ByD architecture implemented, at least in part, using ABAP supported applications, and service providing components implemented using various frameworks (e.g., frameworks supported by Java, ADS, etc.), the various parts of the system 100 may be implemented using other types of frameworks. In such implementations, monitoring of the parts/sections of the system may be performed in a similar manner to the monitoring operations performed for system 100. That is, such implementations may include monitoring mechanisms to monitor the infrastructure of the system (e.g., reachability and availability of service providing components from clients interconnected to the service providing components via an interfacing system), and application monitoring to monitor the operability of service providing components. The interplay of the various monitoring can enable in such other system implementations an efficient monitoring of the overall system without requiring excessive redundant monitoring and/or the excessive creation of incidents and alerts.

Figure 3:
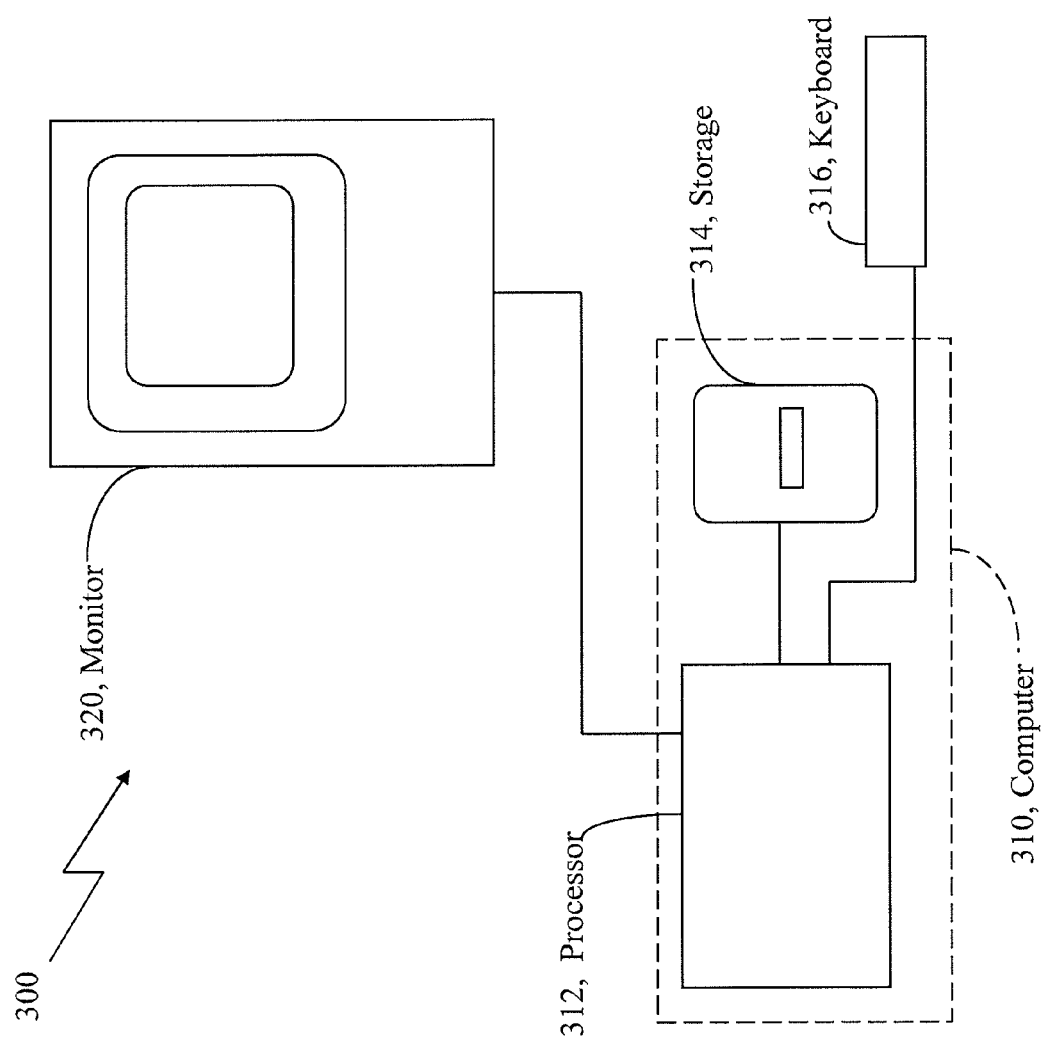
FIG. 3 is a schematic diagram of a computing system that may be used in the implementation of any one of the various depicted components/units/device of FIGS. 1 and/or 2.

Each of the various components/units/devices shown in FIGS. 1 and 2 may be implemented using a processor-based computing device. Referring to FIG. 3, a schematic diagram of a computing system 300 that may be used in the implementation of any one of the various depicted components/units/device of FIGS. 1 and/or 2 is shown. The computing system 300 includes a processor-based device 310 such as a personal computer; a personal digital assistant, a specialized computing device or a reading machine and so forth, that typically includes a central processor unit 312. In addition to the CPU 312, the system includes main memory, cache memory and bus interface circuits (not shown). The processor-based device 310 includes a mass storage element 314. The computing system 300 may further include a keyboard 316, a monitor 320, e.g., a CRT (cathode ray tube) or LCD (liquid crystal display) monitor.

The processor-based device 310 is configured to perform some or all of the system monitoring operation described herein, including operations to perform various operability status monitoring operations, and to determine, based on the interplay of the various monitoring results, the operability, availability and/or reachability of the various components/units/devices of the system. Monitoring operations may be performed by monitoring procedures implemented, for example, as software applications executed on the processor-based devices such as the processor-based device 310. The storage device 314 may include computer program products that when executed on the processor-based device 310 results in at least some of the monitoring procedures described herein.

The processor-based device may further include peripheral devices to enable input/output functionality. Such peripheral devices include, for example, a CD-ROM drive and/or floppy drive, or a network connection, for downloading related content to the connected system. Such peripheral devices may also be used for downloading software containing computer instructions to enable general operation of the respective system/device, and for downloading software implemented programs to perform operations pertaining to the monitoring procedures described herein. Alternatively and/or additionally, in some implementations, special purpose logic circuitry, e.g., an FPGA (field programmable gate array) or an ASIC (application-specific integrated circuit) may be used in the implementation of the system 300.

Other modules that may be included with the processor-based device 310 are speakers, a sound card, a pointing device, e.g., a mouse or a trackball, by which the user can provide input to the computing system 300. Other kinds of devices can be used to provide for interaction with a user. For example, feedback provided to the user can be any form of sensory feedback, e.g., visual feedback, auditory feedback, or tactile feedback, and input from the user can be received in any form, including acoustic, speech, or tactile input. etc. (none of the additional modules are shown). The processor-based device 310 may include an operating system, e.g., Windows XP® Microsoft Corporation operating system. Alternatively, other operating systems could be used.

Figure 4:
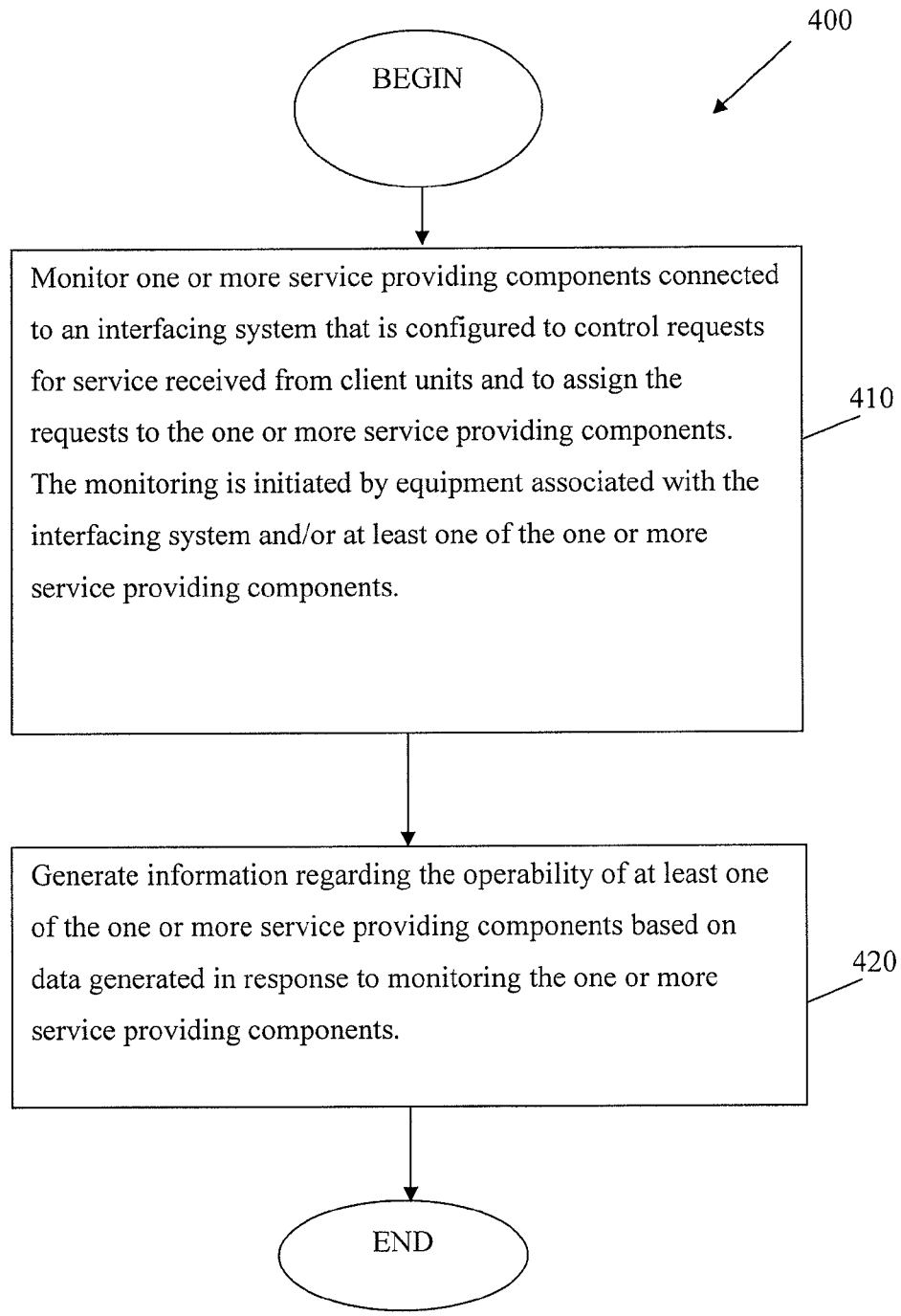
FIG. 4 is a flowchart of a system monitoring procedure.

Referring to FIG. 4, a flowchart of a monitoring procedure 400 is shown. The procedure 400 includes monitoring 410 one or more service providing components connected to an interfacing system in communication with each of the one or more service providing components. In some implementations, the service providing components include applications (e.g., executing on one or more computing devices) such as, for example, Adobe system applications, Java based applications, applications implemented using ABAP, etc. The interfacing system to which the various service providing components are connected may be configured to control requests for service received from client units (implemented, in some implementations, as computing devices that are connected to the service providing components via the interfacing system). The interfacing system may include, in some implementation a load balancing server configured to assign the work (e.g., service requests) to available resource (e.g., the one or more service providing components). In some implementations, the interfacing system may also include a host system to control the client units interconnected thereto. An example of a host system and client system configuration is the By Design system, which includes a cluster of client units configured to conform to the ByD framework, and a service providing cockpit, such as the SPC 224 of FIG. 2, to control the various client units.

Monitoring the one or more service providers is initiated, in some implementations, by equipment associated with one or more of the interfacing system and at least one of the one or more service providing components. For example, the monitoring can be caused by the interfacing system itself or by dedicated monitoring instrumentation (e.g., a device connected to the interfacing system, or a software application installed on the interfacing system). Monitoring of the service providing components is therefore not initiated or commenced from inter-connectable client units, thus avoiding the execution of multiple redundant monitoring operations. For example, a particular service providing component can provide health check information regarding its operability in response to a single monitoring request made by the interfacing system or by the component itself, instead of having to produce and communicate multiple redundant health check information in response to multiple monitoring requests made by individual client units.

When monitoring is initiated by the one or more service providing components, the monitoring operations may be performed by the service providing components, or by dedicated monitoring instrumentations install on at least some of the service providing components. Such dedicated monitoring instrumentation may include monitoring agents, such as Wily monitoring agents, installed on the service providing components. Monitoring agents may perform a set of health checks on the respective service providing components on which they are installed, and communicate data computed based on those health check operations to a central device that collects the metrics from various agents, performs further processing on the collected data and communicates the processed data to, for example, the interfacing system. An example of a central device to collect data from individual agents is the Wily Enterprise Manager application.

Information regarding the operability and/or the availability of at least one of the service providing components is thus generated 420 based on data generated in response to monitoring the one or more service providing components. For example, the interfacing system can receive operability data from the individual agents associated with the service providing components, as well as from the monitoring equipment associated with the interfacing system. Based on that information, a determination can be made of whether the system is working properly, or whether there are incidents (e.g., potential components and/or system failure) that need to be reported to an administrator and/or resolved (e.g., automatically resolved by initiating remedial operations to repair broken communication links, etc.). As noted above, if, for example, the interfacing system's monitoring equipment indicates that none of the service providing components that are generally connectable to the interfacing system is available, a report may be generated to notify users, the interfacing system and/or some other connected server, that there is no communication link between the interfacing system and/or any of the service providing components. In response to such notification, appropriate remedial action may be undertaken.

Figure 5:
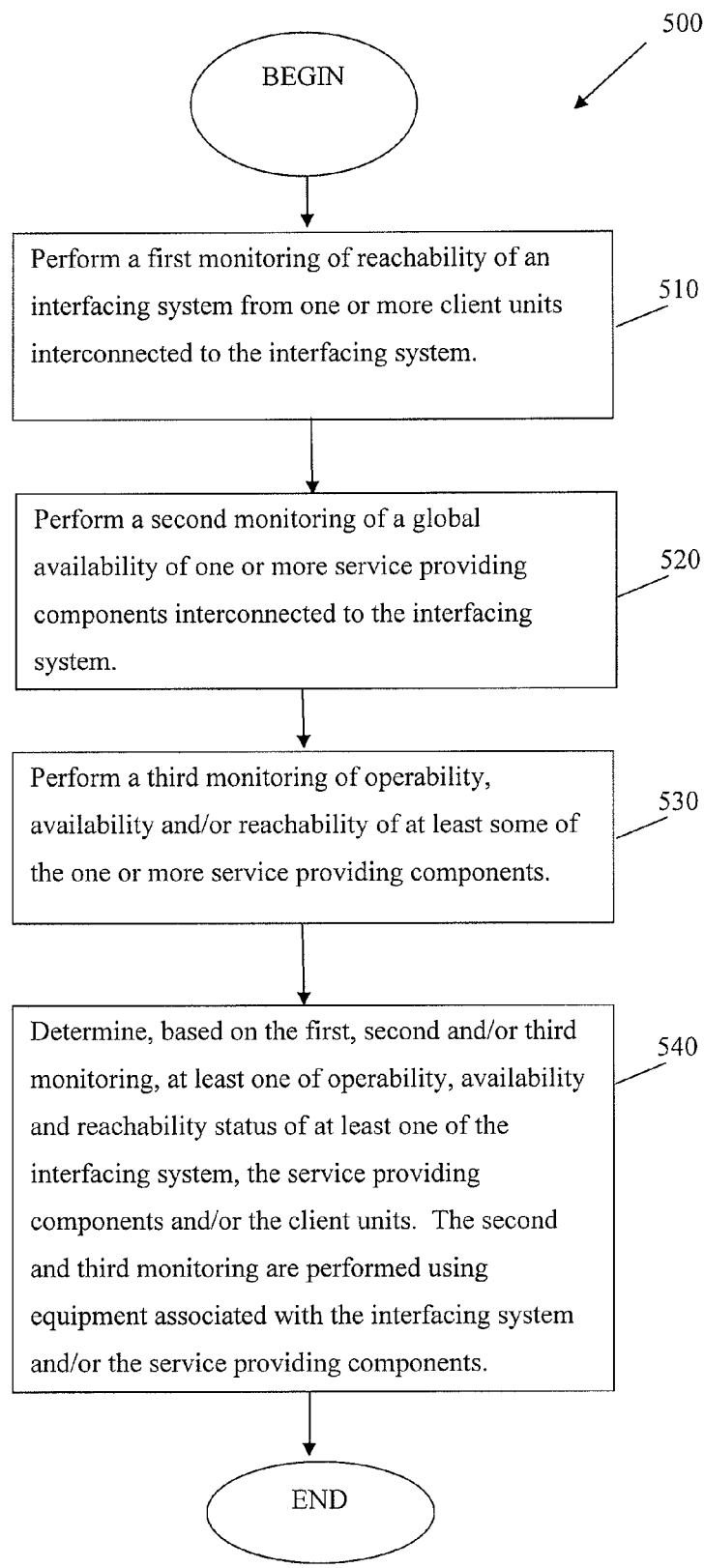
FIG. 5 is a flowchart of another system monitoring procedure involving several types of monitoring operations.

With reference to FIG. 5, a flowchart of another implementation of a monitoring procedure 500 involving several types of monitoring operations is shown. The procedure 500 includes performing 510 a first monitoring of reachability of an interfacing system from one or more client units inter-connectable to the interfacing system. For example, as described herein, each of the client units (such as the client units 112*a-n* depicted in FIG. 1) may be equipped with a monitoring instrumentation to monitor or probe the interfacing system to thus determine if the particular client units are connected to the interfacing system. Alternatively and/or additionally, the interfacing system may be equipped with instrumentation to probe client units and determine, based on the responses (or the failure to respond) which client units can reach the interfacing system. The data generated as a result of the first monitoring may be provided to the interfacing system, to some other server managing the network operability, to a user, etc.

The procedure 500 also includes performing 520 a second monitoring of a global availability of one or more service providing components inter-connectable to the interfacing system. That is, monitoring instrumentation installed on, for example, the interfacing system probes the cluster of service providing components to determine if any of the service providing components is available. The second monitoring may be done concomitantly with the first monitoring, or at a different time.

Additionally, a third monitoring is performed 530 to determine the operability, availability and reachability of at least one of the one or more service providing components. As explained above with respect to FIGS. 1, 2 and 4, in some implementations, this monitoring may be performed by an implementation that includes individual monitoring agents installed on respective service providing components. Data produced by such agents can be forward to a central data collecting device and/or provided to the interfacing system. The third monitoring may be done concomitantly with the first and/or second monitoring, or at a different time.

As noted above, monitoring the availability and/or operability of the service providing components is initiated by equipment associated with the interfacing system and/or the service providing components.

Having performed the first, second and third monitoring, at least one of operability, availability and reachability status of at least one of the interfacing system, the one or more service providing components and/or the one or more client units is determined 540 based on at least one of the first, second and third monitoring. Based on this determination, further action may be taken, e.g., initiating remedial action to fix an identified problem, report a network incident to an operator or a managing server, etc.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. Accordingly, other embodiments are within the scope of the following claims.

What is claimed is:

1. A method comprising:
   monitoring one or more service providing components implemented using at least one processor-based device, the one or more service providing components being connected to an interfacing system, the interfacing system configured to control requests for service received from client units requiring servicing from at least one of the one or more service providing components and to assign the requests to the one or more service providing components, wherein the monitoring is initiated by equipment associated with one or more of the interfacing system and at least one of the one or more service providing components; and
   generating information regarding the operability of at least one of the one or more service providing components based on data generated in response to monitoring the one or more service providing components, wherein the monitoring of the one or more service providing components further comprises:
      determining, by respective monitoring agents included with at least some of the one or more service providing components, the operability status of the associated one or more service providing components, and communicating data based on the determined operability status to the interfacing system.

2. The method of claim 1, wherein generating information comprises:
   communicating an indication of system failure if all the monitored one or more service providing components fail to respond.

3. The method of claim 1, wherein generating information comprises:
   triggering alerts indicative of failure of at least one of the one or more of the service providing components.

4. The method of claim 1, further comprising:
   resolving, based on the generated information, at least one of: a failure of one of the one or more service providing components and a communication link failure of any of the service providing components, the client units and the interfacing system.

5. The method of claim 1, wherein the interfacing system includes one or more of: a load balancing server to distribute requests for service to the one or more service providing components and a host system to control the client units connected to the interfacing system.

6. The method of claim 5, wherein monitoring the one or more service providing components comprises:
   monitoring the one or more service providing components using a monitoring module included with one or more of the load balancing server and the host system.

7. The method of claim 1, further comprising:
   monitoring reachability of the interfacing system from any one of the client units.

8. The method of claim 1, wherein the determined operability status includes a performance metric determined based on a measurement made by the at least one of the monitoring agents, and wherein the monitoring agents include at least one Wily™ monitoring agent.

9. A system comprising:
   one or more service providing components implemented using at least one processor-based device;
   one or more client units each configured to generate requests for service to be serviced by some of the one or more service providing components, the one or more client units implemented using at least one other processor-based device;
   an interfacing system in communication with the one or more service providing components, the interfacing system configured to control the requests for service generated by the one or more client units and to assign the requests to the one or more service providing components; and
   monitoring equipment to monitor the one or more service providing components, the monitoring equipment being associated with one or more of the interfacing system and at least one of the one or more service providing components, wherein the monitoring is initiated by one or more of the monitoring equipment, the interfacing system and the one or more service providing components.

10. The system of claim 9, further comprising:
    an output unit to present information regarding the operability of at least one of the one or more service providing components based on data generated by monitoring the one or more service providing components.

11. A computer program product residing on a non-transitory computer readable storage device and comprising computer instructions that, when executed on a processor-based device, cause the processor-based device to:

monitor one or more service providing components connected to an interfacing system, the interfacing system configured to control requests for service received from client units requiring servicing from the one or more service providing components and to assign the requests to at least one of the one or more of the service providing components, wherein the monitoring is initiated by equipment associated with one or more of the interfacing system and at least one of the one or more service providing components; and generate information regarding the operability of at least one of the one or more service providing components based on data generated in response to monitoring the one or more service providing components, wherein the monitoring of the one or more service providing components further comprises:

determining, by respective monitoring agents included with at least some of the one or more service providing components, the operability status of the associated one or more service providing components, and communicating data based on the determined operability status to the interfacing system.

12. The computer program product of claim 11, wherein the computer instructions that cause the processor-based device to generate information comprise instructions that cause the processor-based device to:

communicate an indication of system failure if all the monitored one or more service providing components fail to respond.

13. The computer program product of claim 11, wherein the interfacing system includes one or more of: a load balancing server to distribute requests for service to the one or more service providing components and a host system to control the client units connected to the interfacing system.

14. A method comprising:

performing a first monitoring of reachability of an interfacing system from one or more client units interconnected to the interfacing system, the one or more client units implemented using at least one processor-based device;

performing a second monitoring of a global availability of one or more service providing components interconnected to the interfacing system, the one or more service providing components servicing requests for service sent by at least one of the one or more client units and assigned to at least one of the one or more service providing component by the interfacing system, the one or more service providing components implemented using at least one other processor-based device;

performing a third monitoring of one or more of the operability, availability and reachability of at least one of the one or more service providing components; and determining, based on at least one of the first monitoring, the second monitoring and the third monitoring, at least one of operability, availability and reachability status of at least one of the interfacing system, the one or more service providing components and the one or more client units;

wherein the second and third monitoring are performed using equipment associated with one or more of the interfacing system and at least one of the one or more service providing components.

15. The method of claim 14, wherein the interfacing system includes one or more of: a load balancing server to distribute requests for service to the one or more service providing components and a host system to control the client units connected to the interfacing system.

16. The method of claim 14, wherein determining the at least one of operability, availability and reachability status comprises:

determining occurrence of no connectivity between one of the one or more client units and the interfacing system based on an indication generated in response to the first monitoring that the interfacing is not reachable from the one of the one or more client units.

17. The method of claim 14, wherein determining the at least one of operability, availability and reachability status comprises:

determining occurrence of no availability of service from any of the one or more service providing components based on an indication, generated in response to the second monitoring, that the one or more service providing components are not globally available from the interfacing system.

18. The method of claim 14, wherein determining the at least one of operability, availability and reachability status comprises:

determining occurrence of a component failure at a particular one of the one or more service providing components based on an indication generated in response to the third monitoring that service at the particular one of the one or more service providing components is not available from the interfacing system.

19. The method of claim 14, wherein performing the third monitoring comprises:

monitoring each of the one or more service providing components using a Wily instrumentation controlled by a health check procedure executing from a service provider cockpit of the interfacing system;

determining, by respective monitoring agents included with at least some of the one or more service providing components, operability data of the associated at least some of the one or more service providing components; and communicating data based on the determined operability data to the interfacing system;

wherein the monitoring agents include agents configured to operate in a Wily Introscope™ system.

* * * * *